United States Patent
Venkataramani et al.

(10) Patent No.: US 11,354,573 B2
(45) Date of Patent: Jun. 7, 2022

(54) DYNAMICALLY RESIZING MINIBATCH IN NEURAL NETWORK EXECUTION

(71) Applicant: International Business Machines Corporation, Armonk, NY (US)

(72) Inventors: Swagath Venkataramani, Yonkers, NY (US); Vijayalakshmi Srinivasan, New York, NY (US); Jungwook Choi, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 600 days.

(21) Appl. No.: 16/362,945

(22) Filed: Mar. 25, 2019

(65) Prior Publication Data

US 2020/0311536 A1    Oct. 1, 2020

(51) Int. Cl.
*G06N 3/08* (2006.01)
*G06N 3/04* (2006.01)

(52) U.S. Cl.
CPC .................. *G06N 3/08* (2013.01); *G06N 3/04* (2013.01)

(58) Field of Classification Search
CPC ............ G06N 3/04; G06N 3/08; G06N 3/084; G06N 3/0454; G06N 3/063
See application file for complete search history.

(56) References Cited

U.S. PATENT DOCUMENTS

| | | | |
|---|---|---|---|
| 2016/0322042 A1 | 11/2016 | Vlietinck et al. | |
| 2016/0379111 A1 | 12/2016 | Bittner, Jr. et al. | |
| 2017/0046616 A1 | 2/2017 | Socher et al. | |
| 2017/0147920 A1 | 5/2017 | Huo et al. | |
| 2018/0189424 A1* | 7/2018 | Boesch | .................. G06N 20/10 |
| 2018/0189642 A1 | 7/2018 | Boesch et al. | |
| 2019/0362227 A1* | 11/2019 | Seshadri | .................. G06N 3/04 |
| 2020/0226424 A1* | 7/2020 | Willcock | ............. G06F 16/9017 |

FOREIGN PATENT DOCUMENTS

EP     3346425 A1     7/2018

OTHER PUBLICATIONS

Bulb, Samuel Rota, Lorenzo Porzi, and Peter Kontschieder. "In-place activated batchnorm for memory-optimized training of dnns." Proceedings of the IEEE Conference on Computer Vision and Pattern Recognition. 2018. (Year: 2018).*
Sohl-Dickstein, Jascha, Ben Poole, and Surya Ganguli. "Fast large-scale optimization by unifying stochastic gradient and quasi-Newton methods." International Conference on Machine Learning. PMLR, 2014. (Year: 2014).*

(Continued)

*Primary Examiner* — Eric Nilsson
(74) *Attorney, Agent, or Firm* — Scully, Scott, Murphy & Presser, P.C.; Joseph Petrokaitis

(57) ABSTRACT

A minibatch in a neural network execution may be dynamically resized based on on-chip memory. For example, a size of the minibatch is configured such that the minibatch fits within on-chip memory. The size of the minibatch may be resized for a sequence of layers in the neural network execution. A next layer's execution can commence responsive to the resized minibatch being completed in a previous layer without having to wait for all of the minibatch to be completed in the previous layer.

20 Claims, 7 Drawing Sheets

(56) References Cited

OTHER PUBLICATIONS

Ioffe, Sergey. "Batch renormalization: Towards reducing minibatch dependence in batch-normalized models." Advances in neural information processing systems 30 (2017). (Year: 2017).*

NIST, "NIST Cloud Computing Program", http://csrc.nist.gov/groups/SNS/cloud-computing/index.html, Created Dec. 1, 2016, Updated Oct. 6, 2017, 9 pages.

Turchenko, V., et al., "Parallel Batch Pattern Training Algorithm for Deep Neural Network", 2014 International Conference on High Performance Computing & Simulation (HPCS 2014), Jul. 21-25, 2014, pp. 697-702.

Posewsky, T., et al., "Efficient Deep Neural Network Acceleration Through FPGA-based Batch Processing", 2016 International Conference on Reconfigurable Computing and FPGAs (ReConFig 2016), Dec. 3-5, 2016, 8 pages.

Gholami, A., et al., "Integrated Model, Batch, and Domain Parallelism in Training Neural Networks", in Proceedings of the 30th on Symposium on Parallelism in Algorithms and Architectures (SPAA '18), Session 2, Jul. 16-18, 2018, pp. 77-86.

\* cited by examiner

DYNAMICALLY RESIZING MINIBATCH IN NEURAL NETWORK EXECUTION

BACKGROUND

The present application relates generally to computers and computer applications, artificial intelligence and more particularly to machine learning.

Machine learning may include artificial neural networks such as deep neural networks (DNNs). In one aspect, DNNs are used for many machine learning problems such as image recognition, video recognition, natural language processing, machine translation and/or others. Such deep neural networks can process large amounts of data and may have networks that are complex. In one aspect, training a large-scale DNN can takes several days, for example, even on hardware accelerators.

BRIEF SUMMARY

A method, in one aspect, may include dynamically resizing a minibatch in a neural network execution, wherein a size of the minibatch is configured such that the minibatch fits within on-chip memory.

A system, in one aspect, may include at least one hardware processor and a memory device coupled with the hardware processor. The at least one hardware processor may be operable to at least to dynamically resize a minibatch in a neural network execution, wherein a size of the minibatch is configured such that the minibatch fits within on-chip memory.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
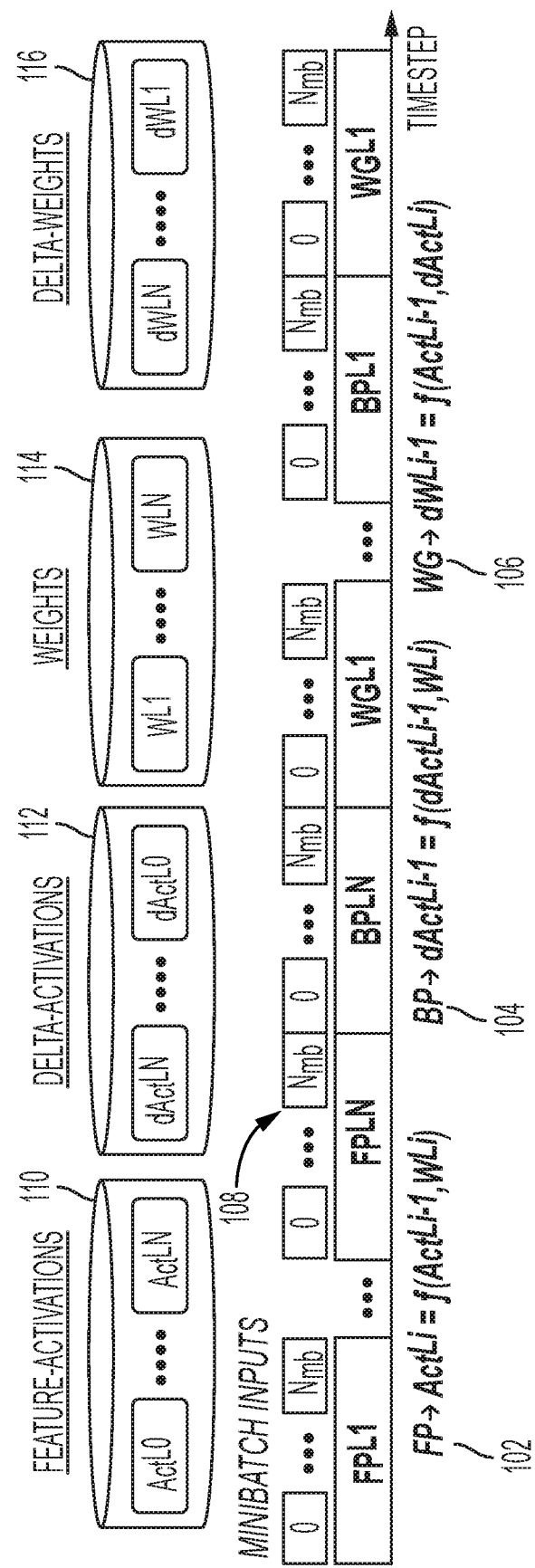
FIG. 1 illustrates a neural network computation using minibatch in one embodiment.

A system, method and technique may be provided for dynamically resizing minibatch in machine learning, for instance, for memory and bandwidth optimized deep neural network execution. Artificial neural networks, for example, deep neural networks have demonstrated relatively high accuracy on several artificial intelligence (AI) tasks involving images, videos, text and natural language. In one aspect, minibatch refers to a number of training instances (e.g., data samples) used in an iteration (e.g., one forward propagation and backpropagation iteration) to estimate a gradient of a loss function and update weights or parameters of a neural network. Minibatch is usually a subset of a training data set or a smaller number of a training data set.

A methodology, referred to as dynamic spatial minibatching, in one embodiment, breaks a minibatch to smaller spatial-minibatches that are processed spatially at a given time. Such a methodology in one embodiment reduces a working set size such that an output of a layer of a neural network fits on-chip (integrated circuit (IC)) memory. In one embodiment, the next layer can be processed immediately using this output produced for a given spatial-minibatch, for example, without waiting for an entire minibatch to complete. In one embodiment, such a methodology can avoid reading an input from an external memory, thereby saving memory bandwidth and performance, for instance, in cases in which an entire minibatch may not fit on-chip memory at given time.

A methodology in one embodiment may improve compute efficiency of a deep neural network by leveraging a producer-consumer relationship across layers. For example, in a producer-consumer relationship between layers, output produced by a given layer is input to the next layer. In one aspect, if the output of a layer can be held on chip, then one can avoid fetching the output as the next layer's input from off-chip or memory that is external to the chip (or another location that is associated with cost in fetching data). In this way, in one aspect, feature traffic can be reduced, for example, by two fold (2×). In some aspects, however, because feature sizes are large, for example, for layers such as convolutional layers (in a convolutional neural network), all output may not be able to be held on chip at a given time.

For example, the size of the output may be given by: Nout*Nij*Nmb, where Nout is the number of output features, Nij is the size of each output feature and Nmb is minibatch size. A method in one embodiment, to fit an output on chip, breaks down the minibatch size into smaller sizes. In one embodiment smaller broken down minibatch is referred as a spatial minibatch. After a spatial minibatch is done, the next layer uses this as the input and proceeds with its computation rather than waiting for the entire minibatch (Nmb). This method can save memory bandwidth as input need not be transferred from off-chip, thereby providing a performance benefit.

In one embodiment, a method and/or system also consider resource (e.g., core) utilization and performance, for instance, impact on resource (e.g., core) utilization and performance in decreasing a minibatch. In one embodiment, a method and/or system may choose a minibatch size that is large enough to make efficient use of resources (e.g., make use of all the cores), but small enough that a layer's output fits on chip.

In one aspect, since the size of output features varies across layers, a spatial minibatch size can be also different. In one embodiment, a method and/or system may minimize the number of such changes in spatial mini-batch size, as at a boundary when the output of a layer is written back and fetched again. For example, in one embodiment, a change need not be required in the spatial mini-batch size between successive layers, until the layer where the output is written back to an external memory.

In one embodiment, by breaking down a minibatch into smaller chunks and re-arranging computing to start the next layer(s) without waiting for the entire minibatch to complete, a method and/or system can improve memory bandwidth and performance.

A deep neural network includes primitive compute units called neurons. Neurons are organized in several layers. Layers are defined by how neurons are connected to a layer's inputs. Examples of layers include convolutional layers and fully connected layers. Each layer has a set of parameters called "weights" that are trained.

In one aspect, a method and/or system can improve compute efficiency and performance of training a machine learning model such as a deep neural network, for example, on massively parallel accelerator based systems. For instance, a deep neural network runs on one or more hardware accelerators.

FIG. 1 illustrates a neural network training execution dataflow in one embodiment. In one aspect, DNN training includes learning DNN weights by randomly initializing and iteratively refining the weights based on labeled training input data. In one aspect, DNN training may involve following computation phases: forward propagation (FP), backpropagation (BP) and weight gradient (WG). Forward propagation (FP) 102 evaluates neurons in each layer to compute DNN output. Backpropagation (BP) 104 finds error at output based on labeled data and propagates the error back through each layer. Weight gradient (WG) 106 uses the error at output of each layer to update its weights.

In minibatching, input training data is grouped into minibatches 108. Weights are updated after gradients from all minibatch input data are accumulated. In one aspect, parallelism depends on FP, BP and WG computation phases of each layer across all minibatch input data.

Feature activations 110, delta activations 112, weights 114 and delta weights 116 can be stored on one or more memory and/or storage devices and accessed during training execution. For instance, feature activations 110 may store input and output data associated with forward propagation; delta activations 112 may store input and output data associated with backward propagation (or error propagation); weights 114 may store weights associated with neurons; and delta weights 116 may store weight gradients or updated weights updated based on backward propagation.

In one aspect, input and output features dominate a working set of convolutional layers. Weights can be relatively small. A working set which may include input, output and weights for each layer may be too large to fit on-chip. A portion of the working set can be loaded or brought on-chip, processed and stored back, for example off-chip. In one aspect, an output of one layer is fed as an input to a next layer in a deep neural network. If output of one layer can be fully contained on chip, then one can avoid transferring or fetching the output back again. In cases in which a working set size is too large, an output of a layer may be stored off-chip and brought back on-chip for inputting to a next layer.

A method and/or system in one embodiment breaks down minibatch into smaller pieces referred to as spatial minibatches. Changing the minibatch affects the working set size for input and output, such that the working set can potentially fit on-chip. In one aspect, decreasing the size of the minibatch may also reduce the amount of parallelism. In one embodiment, a method and/system may set a minibatch size for a given layer to a maximum value that can fit on-chip, for instance, to avoid under-utilization of resources such as cores in parallel processing. In one aspect, a minibatch configured based on on-chip memory size or memory capability is referred to as a spatial minibatch (Smb).

In one embodiment, a spatial minibatch size may be determined by performing offline processing. The spatial minibatch size may be determined based on a neural network description of the sizes of the activations, weights, and outputs for the different layers, the on-chip memory capacity of a chip, and the bandwidth needed to perform fetching from an external memory. In one embodiment, the offline processing can sweep through various valid choices for the spatial minibatch for each layer and estimate the performance based on the external bandwidth. The following performance estimation trades-off can be considered in determining the spatial minibatch size: (i) the potential improvement in utilization due to bandwidth saved from being able to hold the spatial minibatch on-chip, (ii) the potential drop in utilization due to the weight/kernel reuse being limited to just the spatial minibatch as opposed to the entire minibatch, and (iii) the cost of being forced to write a layer's outputs to the external memory when adjacent layers use different minibatch sizes. In one embodiment, an offline processing can recommend a spatial minibatch for each layer that maximizes the overall performance for the given external bandwidth and on-chip memory capacity. In one embodiment, the recommendations of the offline processing can be used as inputs when scheduling the execution of the neural network on hardware.

Figure 2:
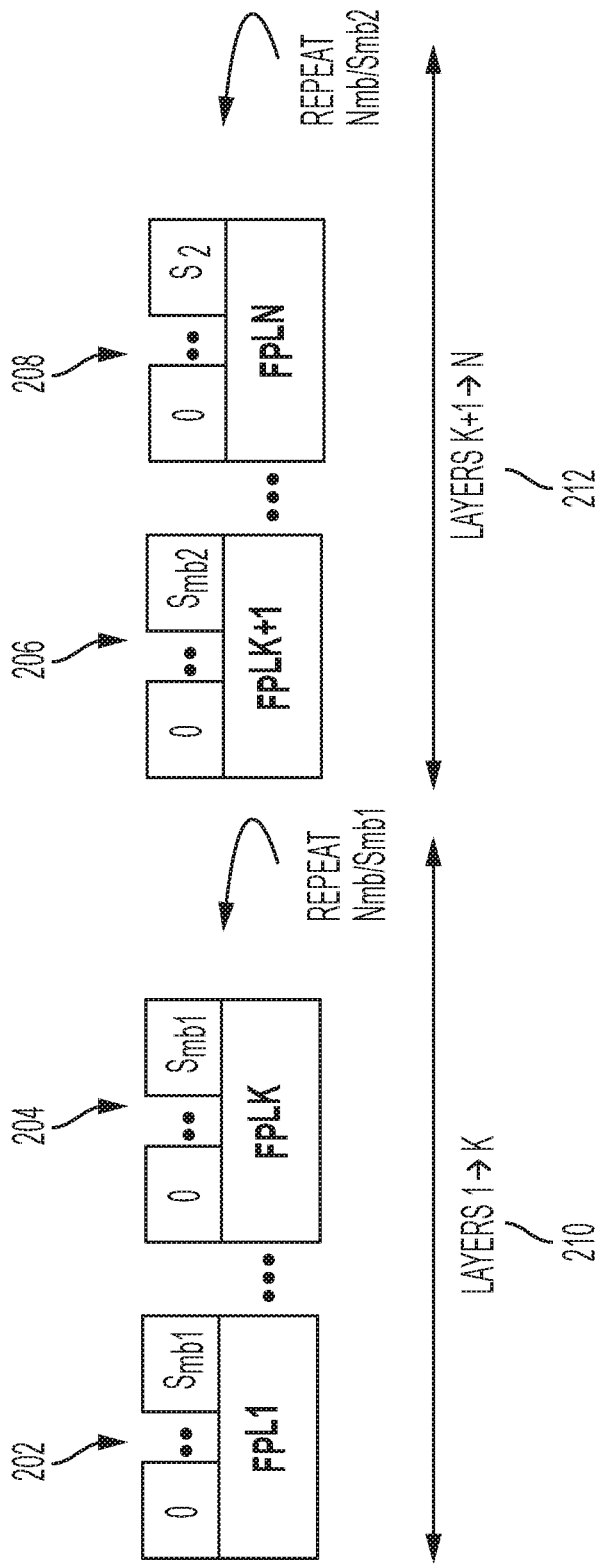
FIG. 2 illustrates a sequence of layers computing output in a deep neural network execution in one embodiment.

FIG. 2 illustrates a sequence of layers computing output in a deep neural network execution in one embodiment. In one aspect, for example, due to a restriction on the on-chip memory capacity, a given minibatch is split into multiple spatial minibatches and computing is re-arranged so as to start the next layer(s) without waiting for the entire minibatch to complete. In one embodiment, such minibatch partitioning is also referred to as spatial minibatching or dynamic spatial minibatching.

In one aspect, a method and/or system in one embodiment re-sequences execution of layers of a neural network or deep neural network. In the following description, Nmb represents a minibatch size (e.g., number or size of data (e.g., feature, input and/or output data size); Smb, Smb1 and Smb2 represent spatial minibatch size. Once a spatial minibatch (Smb) is done at a layer 202, the next layer's execution 204 is commenced, without waiting for the entire minibatch (Nmb) to be done at the layer. In this figure, Smb is shown as Smb1.

In one embodiment, processing of all spatial minibatches can repeat Nmb/Smb times for the layers or a group of layers. For instance, in layers 1 to K 210, a next layer executes on a spatial minibatch from its previous layer (without waiting for the entire minibatch). This processing repeats Nmb/Smb1 times in layers 1 to K 210.

In one embodiment, the second (or next) spatial minibatch processing starts only after a sequence of layers 210 is complete. In one embodiment, the offline processing determines a group of layers for which the same spatial minibatch can maximize overall performance using the given external memory bandwidth and on-chip memory capacity. The offline processing may recommend that the same spatial minibatch size be employed for the group of layers. The spatial minibatch size can be changed after the group of K layers completes the execution for the entire minibatch. In one aspect, this next spatial minibatch processing may have a different spatial minibatch size (e.g., Smb2). Similarly as in layers 1 to K 210, in layers K-N processing 212, once a spatial minibatch (Smb2) is done at a layer 206, the next layer's execution 208 is commenced, without waiting for the entire minibatch (Nmb) to be done at the layer 208. Processing in layers K-N 212 is repeated Nmb/Smb2 times for all spatial minibatches (Smb2).

In one embodiment, weights are fetched Nmb/Smb times from the external memory. For instance, the number of times weights may be fetched from off-chip memory can be the minibatch size divided by the spatial minibatch size. For example, K layers are processed in FIG. 2 without requiring the output activations of the spatial minibatch (Smb1) to be written to the off-chip memory. For each of the K layers the weights are fetched from external (off-chip) memory and are not assumed to be present in the on-chip memory when each spatial mini-batch processing is completed for all the K layers. Hence, weights are fetched from external memory for each spatial minibatch processing leading to Nmb/Smb1 fetches for the weights of the K layers in FIG. 2.

Since feature dimensions of each layer can be different, the spatial minibatch size that fits on-chip can be also different. In one embodiment, a method and/or system may vary the spatial minibatch dynamically across layer sequences. In FIG. 2, different spatial minibatch sizes are shown for processing layers of 1 to K and layers K to N. K and N are integers.

Figure 3:
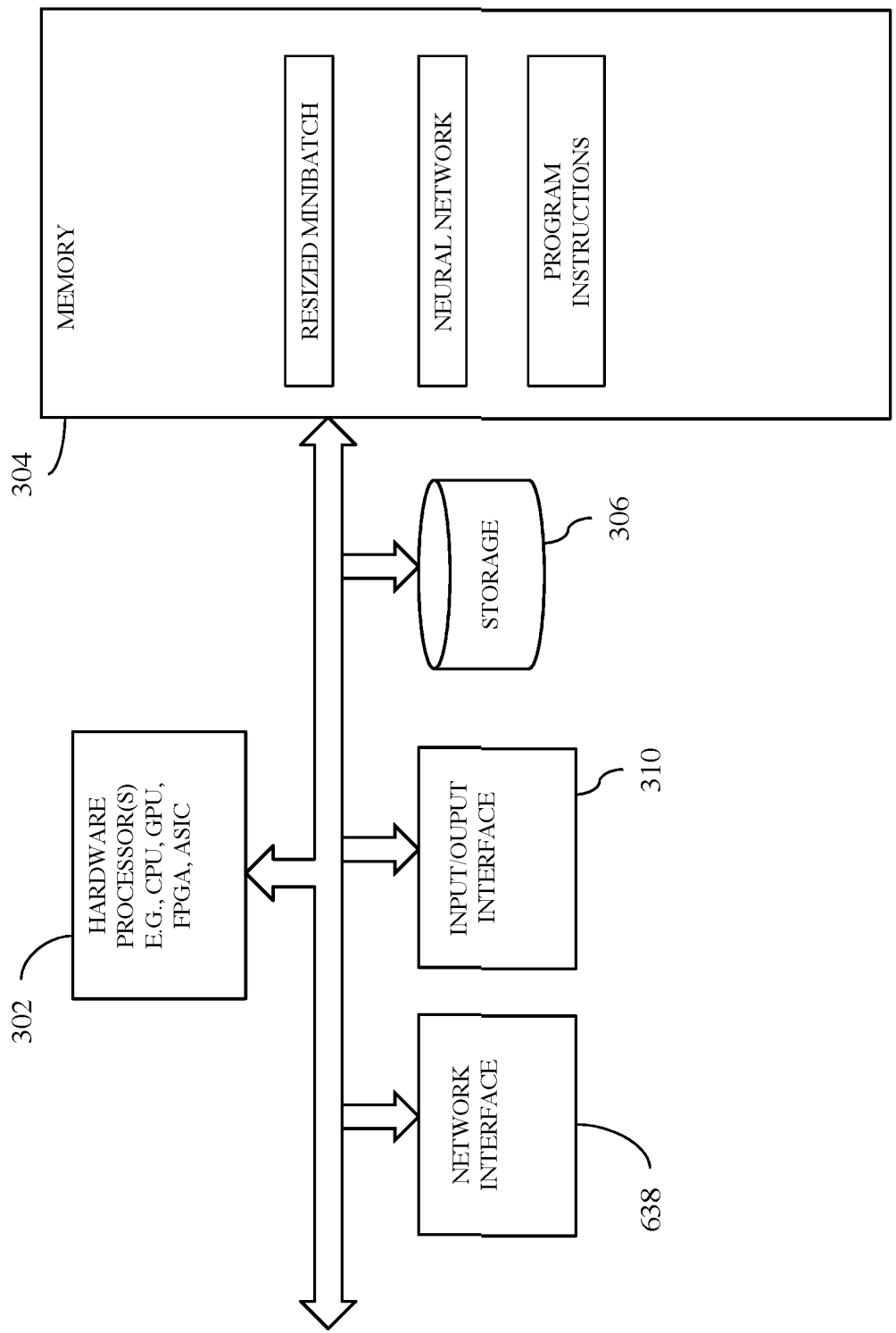
FIG. 3 is a diagram showing components of a system in one embodiment which may break minibatch size to smaller size in neural network execution.

FIG. 3 is a diagram showing components of a system in one embodiment which may break minibatch size to smaller size in neural network execution. One or more hardware processors 302 such as a central processing unit (CPU), a graphic process unit (GPU), and/or a Field Programmable Gate Array (FPGA), an application specific integrated circuit (ASIC), and/or another processor, may be coupled with a memory device 304, and perform neural network execution such as training a neural network, for example, a deep neural network. A memory device 304 may include random access memory (RAM), read-only memory (ROM) or another memory device, and may store data and/or processor instructions for implementing various functionalities associated with the methods and/or systems described herein. One or more processors 302 may execute computer instructions stored in memory 304 or received from another computer device or medium. A memory device 304 may, for example, store instructions and/or data for functioning of one or more hardware processors 302, and may include an operating system and other program of instructions and/or data. One or more hardware processors 302 may receive input comprising minibatch data. For instance, at least one hardware processor 302 may break the minibatch data into smaller sizes for processing, for example, referred to as spatial minibatches. In one aspect, such minibatch data may be stored in a storage device 306 or received via a network interface 308 from a remote device, and may be temporarily loaded into a memory device 304 for AI or neural network training execution. In one aspect, spatial minibatches stay on a memory device 304 for processing in a sequence of layers of a neural network. The learned neural network model may be stored on a memory device 304 and/or a storage device 306. One or more hardware processors 302 may be coupled with interface devices such as a network interface 608 for communicating with remote systems, for example, via a network, and an input/output interface 310 for communicating with input and/or output devices such as a keyboard, mouse, display, and/or others.

Figure 4:
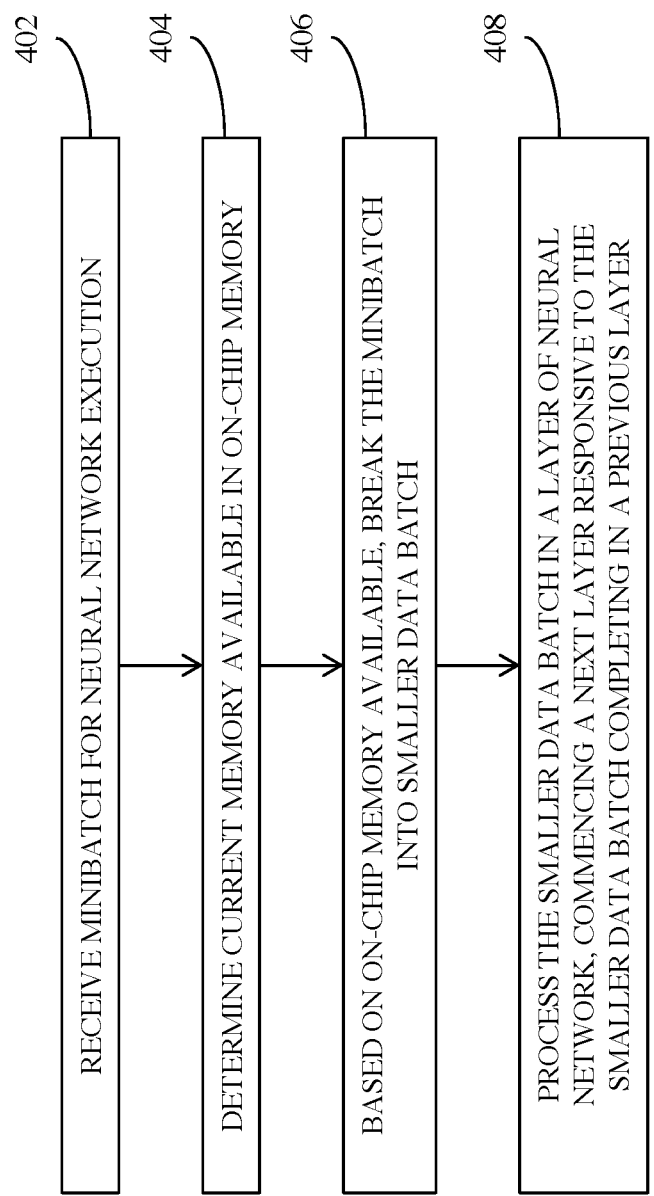
FIG. 4 is a diagram illustrating a method in one embodiment.

FIG. 4 is a diagram illustrating a method in one embodiment. At 402, minibatch may be received for processing, for example, for training a neural network such as a deep neural network. At 404, currently memory available in on-chip memory may be determined. On-chip memory, in one embodiment, refers to memory on L1 cache memory or another memory locally coupled or connected with a processor or core of an integrated circuit (IC). At 406, based on on-chip memory available, the minibatch is broken into smaller data batches, also referred to as spatial minibatches. For instance, the minibatch is dynamically resized, wherein a size of the minibatch is configured such that the minibatch fits within on-chip memory.

In one embodiment, the size of the minibatch is resized to a maximum value that fits within the on-chip memory. In one embodiment, the size of the minibatch is resized differently for a different layer in the neural network execution. In one embodiment, at 408, the size of the minibatch is resized for a sequence of layers in the neural network execution, wherein a next layer's execution commences responsive to the resized minibatch being completed in a previous layer without having to wait for all of the minibatch to be completed in the previous layer. In one embodiment, the previous layer and the next layer are layers of a sequence of layers, wherein processing of the previous layer and the next layer are repeated for minibatch size divided by the size of the resized minibatch times. In one embodiment, the on-chip memory is a hardware accelerator's on-chip memory.

Figure 5:
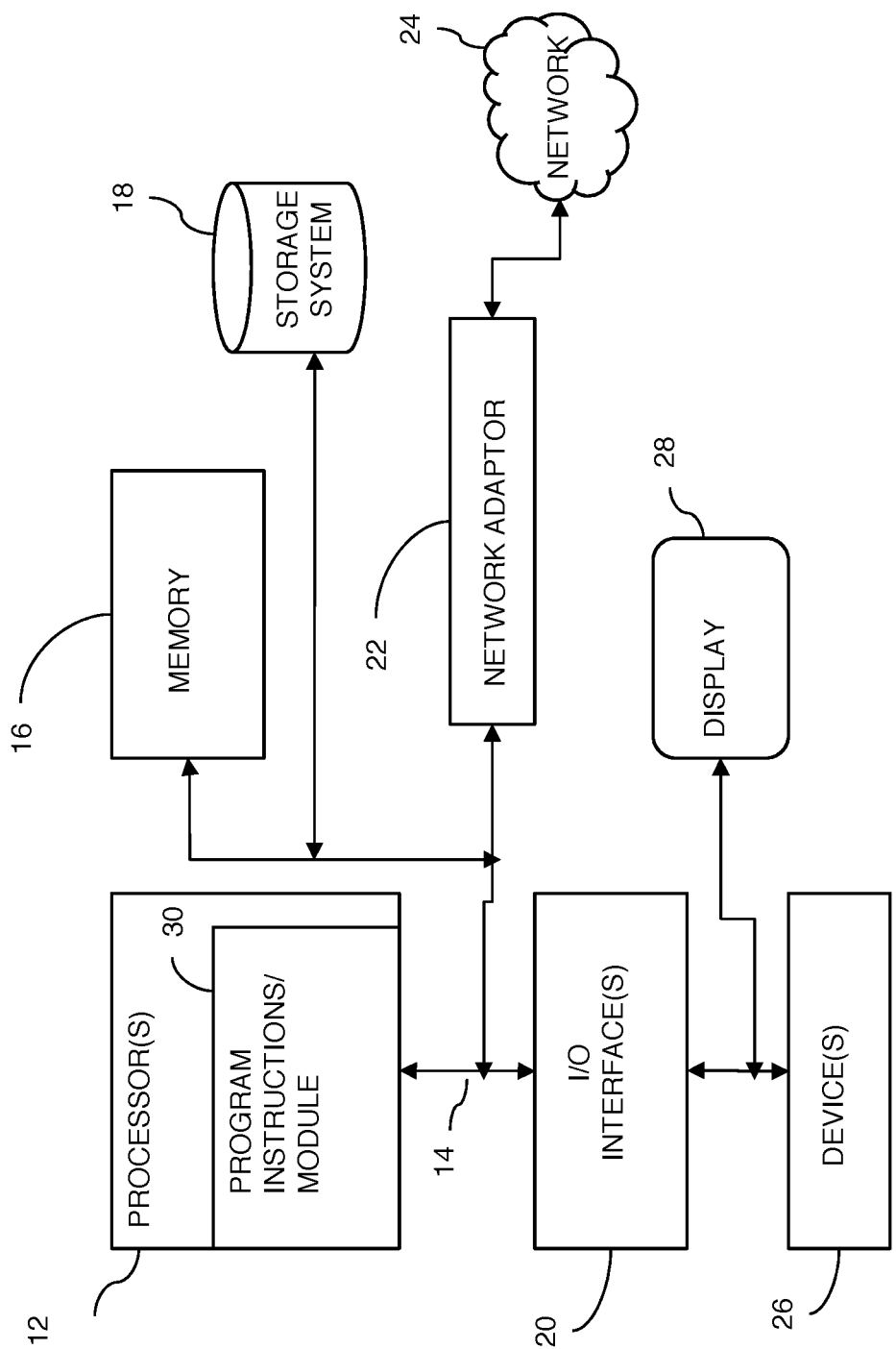
FIG. 5 illustrates a schematic of an example computer or processing system that may implement a system according to one embodiment.

FIG. 5 illustrates a schematic of an example computer or processing system that may implement a system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 5 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
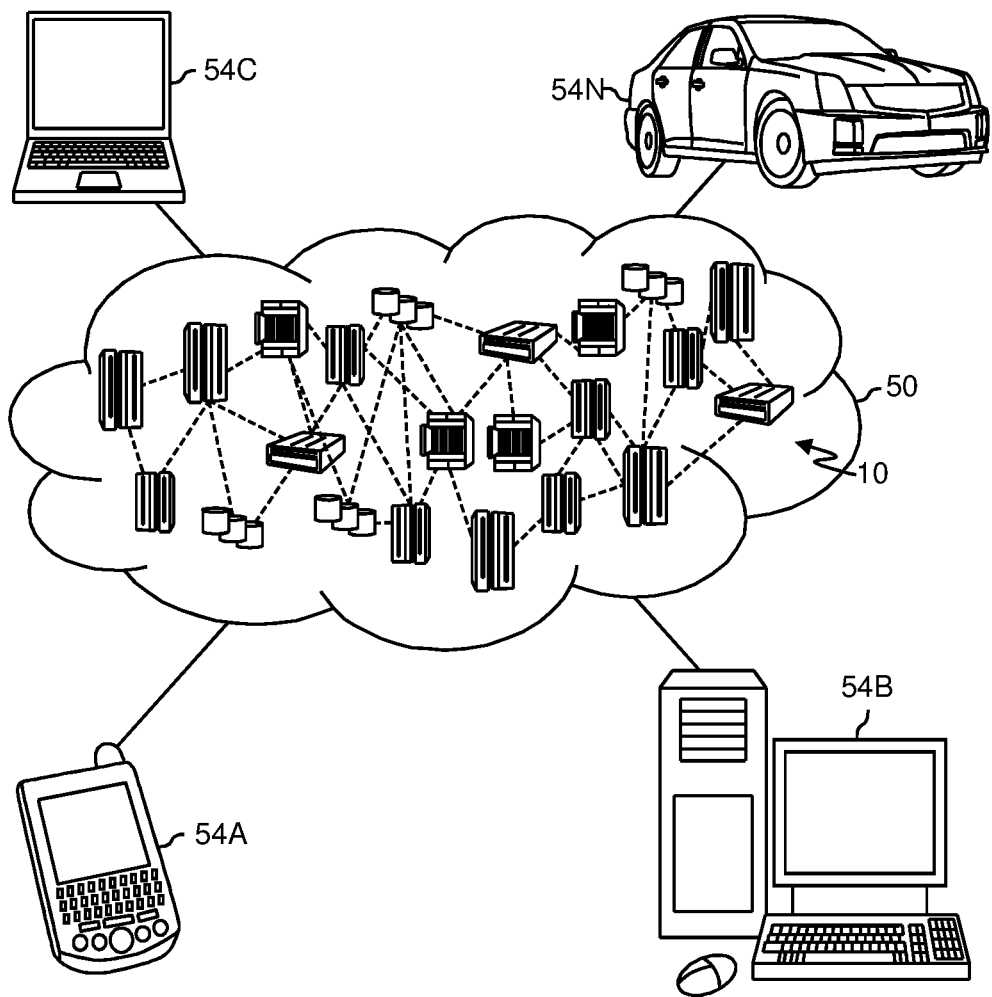
FIG. 6 illustrates a cloud computing environment in one embodiment.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
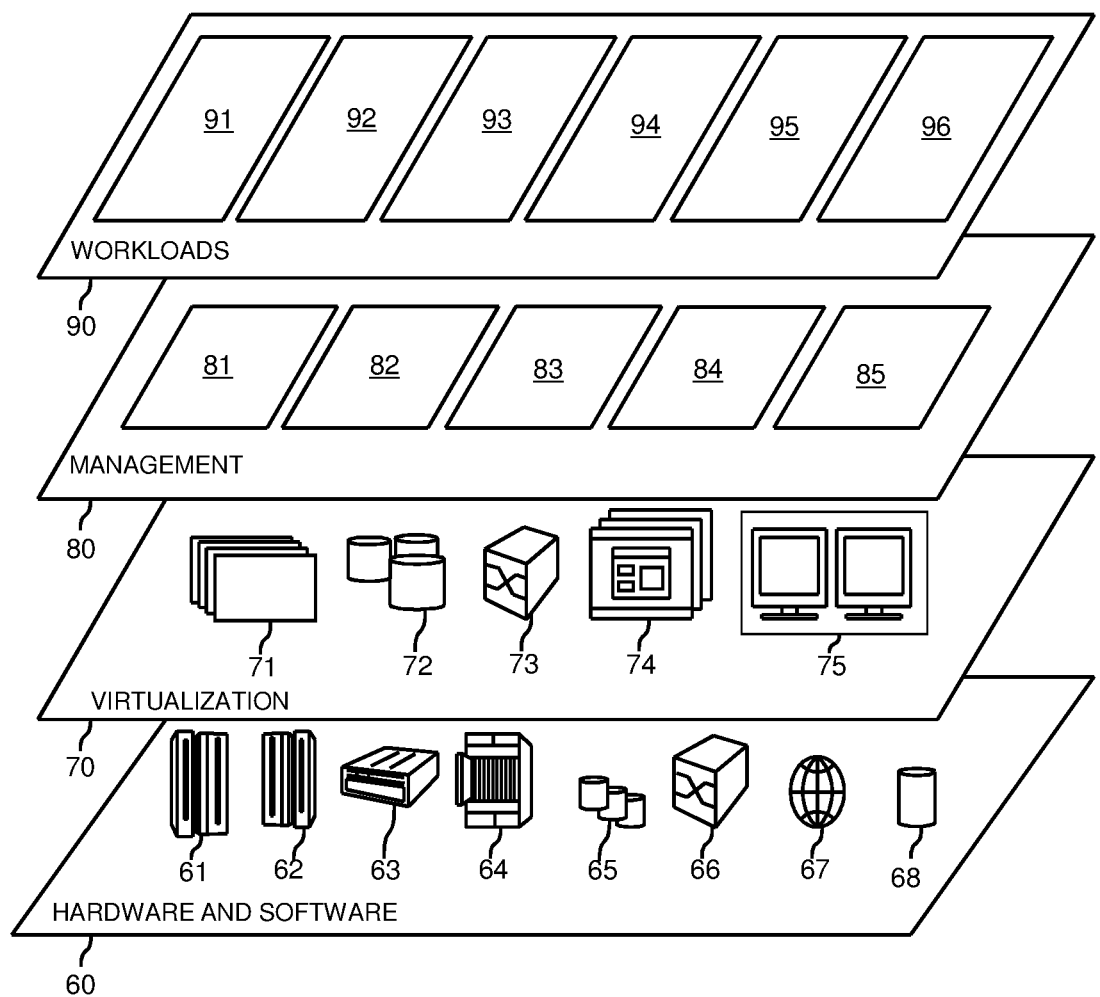
FIG. 7 illustrates a set of functional abstraction layers provided by cloud computing environment in one embodiment of the present disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and minibatch resizing (e.g., dynamic spatial minibatching) processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
dynamically resizing a minibatch in a neural network execution, wherein a size of the minibatch is configured such that the minibatch fits within on-chip memory,
wherein the size is further configured based on a potential improvement in utilization due to bandwidth saved from holding a resized minibatch on-chip, a potential drop in utilization due to weight and kernel reuse applicable only to the resized minibatch and not the minibatch in entirety, and a cost of forced write of a neural network layer's output to an external memory responsive to adjacent layers using different minibatch sizes,
wherein the size of the minibatch is resized for a sequence of layers in the neural network execution, wherein a next layer's execution commences responsive to the resized minibatch being completed in a previous layer without having to wait for all of the minibatch to be completed in the previous layer.

2. The method of claim 1, wherein the size of the minibatch is resized to a maximum value that fits within the on-chip memory.

3. The method of claim 1, wherein the size of the minibatch is resized differently for a different layer in the neural network execution.

4. The method of claim 1, wherein the next layer's execution accesses the resized minibatch residing on the on-chip memory.

5. The method of claim 1, wherein the previous layer and the next layer are layers of a sequence of layers, wherein processing of the previous layer and the next layer are repeated for minibatch size divided by the size of the resized minibatch times.

6. The method of claim 1, wherein the neural network is a deep neural network.

7. The method of claim 1, wherein the on-chip memory is a hardware accelerator's on-chip memory.

8. A system comprising:
at least one hardware processor;
a memory device coupled with the hardware processor;
the at least one hardware processor operable to at least dynamically resize a minibatch in a neural network execution, wherein a size of the minibatch is configured such that the minibatch fits within on-chip memory,
wherein the size is further configured based on a potential improvement in utilization due to bandwidth saved from holding a resized minibatch on-chip, a potential drop in utilization due to weight and kernel reuse applicable only to the resized minibatch and not the minibatch in entirety, and a cost of forced write of a neural network layer's output to an external memory responsive to adjacent layers using different minibatch sizes,
wherein the size of the minibatch is resized for a sequence of layers in the neural network execution, wherein a next layer's execution commences responsive to the resized minibatch being completed in a previous layer without having to wait for all of the minibatch to be completed in the previous layer.

9. The system of claim 8, wherein the size of the minibatch is resized to a maximum value that fits within the on-chip memory.

10. The system of claim 8, wherein the size of the minibatch is resized differently for a different layer in the neural network execution.

11. The system of claim 8, wherein the next layer's execution accesses the resized minibatch residing on the on-chip memory.

12. The system of claim 8, wherein the previous layer and the next layer are layers of a sequence of layers, wherein processing of the previous layer and the next layer are repeated for minibatch size divided by resized minibatch size times.

13. The system of claim 8, wherein the neural network is a deep neural network.

14. The system of claim 8, wherein the on-chip memory is a hardware accelerator's on-chip memory.

15. A computer program product comprising a computer readable storage medium having program instructions embodied therewith, the program instructions executable by a device to cause the device to:
dynamically resize a minibatch in a neural network execution, wherein a size of the minibatch is configured such that the minibatch fits within on-chip memory,
wherein the size is further configured based on a potential improvement in utilization due to bandwidth saved from holding a resized minibatch on-chip, a potential drop in utilization due to weight and kernel reuse applicable only to the resized minibatch and not the minibatch in entirety, and a cost of forced write of a neural network layer's output to an external memory responsive to adjacent layers using different minibatch sizes,
wherein the size of the minibatch is resized for a sequence of layers in the neural network execution, wherein a next layer's execution commences responsive to the resized minibatch being completed in a previous layer without having to wait for all of the minibatch to be completed in the previous layer.

16. The computer program product of claim 15, wherein the size of the minibatch is resized to a maximum value that fits within the on-chip memory.

17. The computer program product of claim 15, wherein the size of the minibatch is resized differently for a different layer in the neural network execution.

18. The computer program product of claim 15, wherein the next layer's execution accesses the resized minibatch residing on the on-chip memory.

19. The computer program product of claim 15, wherein the previous layer and the next layer are layers of a sequence of layers, wherein processing of the previous layer and the next layer are repeated for minibatch size divided by resized minibatch size times.

20. The computer program product of claim 15, wherein the minibatch is resized so that the previous layer can store all of the previous layer's outputs on the on-chip memory for the next layer's execution to access locally without needing to access external memory external to the on-chip memory.

* * * * *